Figure 1:
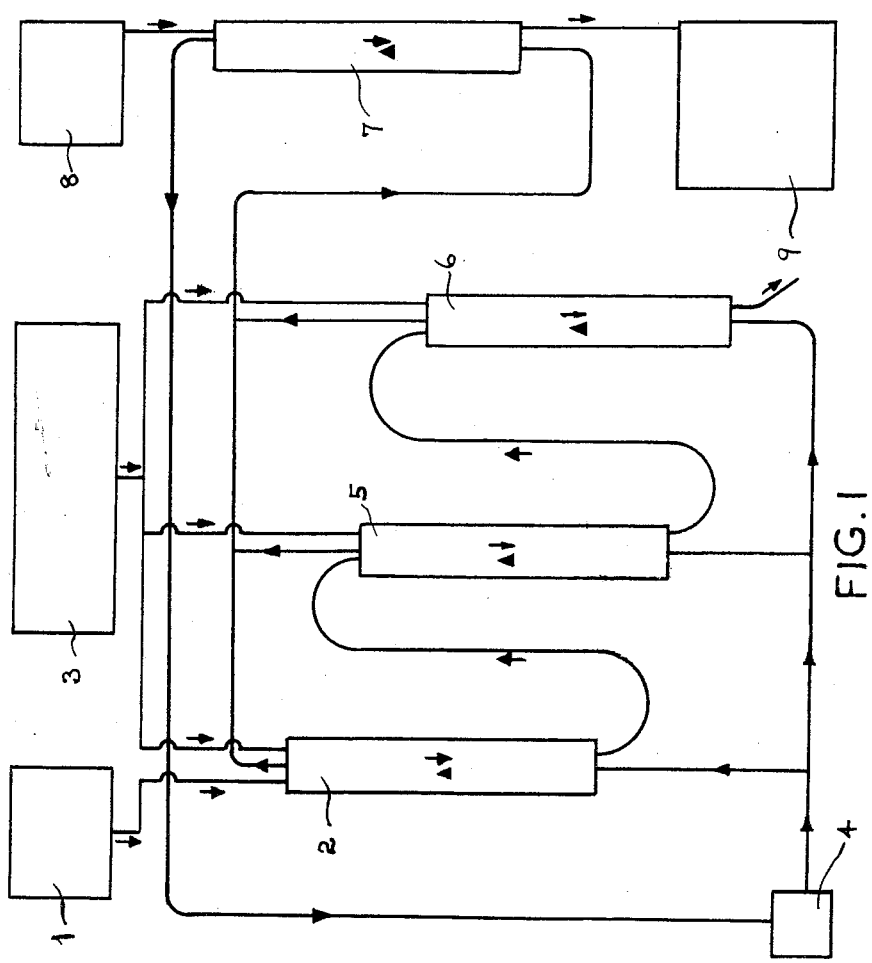

3,047,363
MANUFACTURE OF INORGANIC
THIOCYANATES
John Edward Field, Coventry, and Wilhelm Georg
Schmidt, Walsgrave, Coventry, England, assignors to
Courtaulds Limited, London, England, a company of
Great Britain
Filed May 6, 1960, Ser. No. 27,313
Claims priority, application Great Britain May 14, 1959
7 Claims. (Cl. 23—75)

This invention relates to the manufacture of inorganic thiocyanates.

Aqueous solutions of thiocyanic acid are unstable, the acid decomposing into complex products unless the solution is weak and kept cold. This is probably the reason that most of the known and proposed processes for manufacturing inorganic thiocyanates do not use the reaction of the acid with a base, but depend either on the double decomposition of an available inorganic thiocyanate with a base having the appropriate cation or on the fusion of a cyanide with sulphur. Thus sodium thiocyanate can be made by reacting ammonium thiocyanate and sodium carbonate or by fusing sodium cyanide and sulphur.

The object of this invention is to make inorganic thiocyanates from thiocyanic acid.

According to the invention a process for the manufacture of an inorganic thiocyanate comprises reacting thiocyanic acid dissolved in an inert, substantially water-immiscible liquid with an inorganic base, that is to say a metal, or a metal oxide, or a metal hydroxide.

The inert, substantially water-immiscible liquids used in this invention, which will be referred to hereinafter generally as "solvents," are preferably ethers. Ethers are particularly good for dissolving thiocyanic acid even when in competition with an aqueous phase. Diethyl ether and di-isopropyl ether are useful solvents, of which the di-isopropyl compound is the better.

Other solvents, such as benzene and chloroform, are also suitable, but many of them are less efficient in stripping the acid from an aqueous phase. Higher molecular weight alcohols such as amyl alcohol may also be used, as may higher molecular weight amines and mixtures of solvents, particularly mixtures containing higher molecular weight amines with inert hydrocarbons, e.g. benzene.

The solution of thiocyanic acid in a solvent may be prepared by acidifying a thiocyanate salt, such as sodium thiocyanate or, preferably, ammonium thiocyanate, with an aqueous solution of a strong acid, such as sulphuric acid, in the presence of the solvent. The freshly-formed thiocyanic acid is extracted from the aqueous phase by the solvent, which can then be separated from the aqueous phase.

To obtain the inorganic thiocyanate from the thiocyanic acid solution, the latter may be reacted with an aqueous solution or suspension of the base. If the base is insoluble or only sparingly soluble in water, it may be used in solid form, in which case it may be granulated or pulverised to increase the surface area for reaction with the acid.

When using the solid base, it is preferred to allow the acid solution to percolate through a bed of the base. If the base is sparingly soluble, a solvent for the thiocyanate formed may be allowed to flow through the bed so as to assist the reaction. In any case, the thiocyanate is removed by passing such a solvent through the bed.

The preferred bases are the hydroxides, e.g. those of sodium, calcium and barium. Calcium hydroxide may advantageously be used as described above in the form of a solid bed and when it is so used a stream of water may be passed down through the bed counter-current to the thiocyanic acid solution.

The process can also be applied to the purification of a contaminated thiocyanate salt. Thus, thiocyanic acid may be liberated from a contaminated salt and dissolved in a solvent and the solution reacted with the appropriate base to reform the inorganic thiocyanate.

This method of purifying thiocyanates is particularly important in processing the concentrated thiocyanate solutions used as solvents for polymers and copolymers of acrylonitrile in the manufacture of acrylic fibres. The polymer solutions are extruded into water or dilute thiocyanate solutions to coagulate the polymer and the coagulant liquor is withdrawn for treatment. The solvent properties of the thiocyanate solutions are restored by concentration, but impurities which build up in the recycled solutions interfere with the polymerisation and spinning properties of the spinning solutions. The impurities cannot be efficiently removed by known methods of purification such as crystallisation of the inorganic thiocyanate, but the present process substantially removes the impurities.

The invention is illustrated by the following examples, wherein reference is made to the accompanying drawings, which illustrate schematically two forms of apparatus for carrying out the present invention.

*Example 1*

In the course of six hours and forty minutes, 15,125 ml. of a contaminated sodium thiocyanate solution (containing 16.3 percent by weight NaSCN) were fed from a liquor reservoir 1 to the head of a column 2 (FIGURE 1). In the same period 980 ml. of 14.25 N sulphuric acid were fed from an acid reservoir 3 to the head of column 2. The mixture of sulphuric acid and sodium thiocyanate solution reacted to produce an aqueous solution containing thiocyanic acid, sodium sulphate, unreacted sodium thiocyanate and impurities. The aqueous solution descended the column 2 through a packing of 43 inches of 3/16" glass Raschig rings. Di-isopropyl ether was supplied at the approximate rate of 70 ml./minute to the base of the column 2 from a reservoir 4. The ether ascended the column in counter-current to the aqueous phase and contained 2.73 gm./100 ml. of thiocyanic acid on emerging from the head of the column 2. Column 5, a replica of column 2, was supplied with sulphuric acid and di-isopropyl ether from reservoirs 3 and 4 respectively in the same quantities as those employed for column 2, but the aqueous phase leaving column 2 was fed as shown to the head of column 5. The ethereal phase leaving the head of column 5 contained 2.28 gm./100 ml. of thiocyanic acid. The process was repeated in column 6 using the aqueous phase leaving column 5 and feeding the same quantities of sulphuric acid and di-isopropyl ether at the same rates as those used in column 2. The di-isopropyl ether leaving column 6 contained 1.42 gm./100 ml. of thiocyanic acid.

The aqueous phase leaving column 6 contained only 0.94 percent by weight sodium thiocyanate and all the water soluble impurities of the original contaminated solution and was discarded. The combined ethereal washings (approximately 84 litres) containing 2.6 gm. of thiocyanic acid per 100 ml. was led to the base of a scrubber 7 whilst 1640 ml. of 46 percent by weight aqueous caustic soda was supplied at the rate of 4.1 ml./min. to the head of the scrubber 7 from an alkali reservoir 8. The sodium thiocyanate formed by the reaction of the thiocyanic acid and the caustic soda dissolved in the aqueous phase to form a 46 percent by weight solution which passed from the scrubber 7 to a storage vessel 9. The ether, stripped of the dissolved thiocyanic acid, left the head of the scrubber 7 and was returned to the ether reservoir 4.

*Example 2*

The manufacture of sodium thiocyanate solution from a solution of, say, ammonium thiocyanate, can be accomplished using the same apparatus and quantities of reactants as in Example 1 if a 15.2 percent by weight solution of ammonium thiocyanate is substituted for the contaminated 16.3 percent by weight sodium thiocyanate solution used in the example.

*Example 3*

Figure 2:
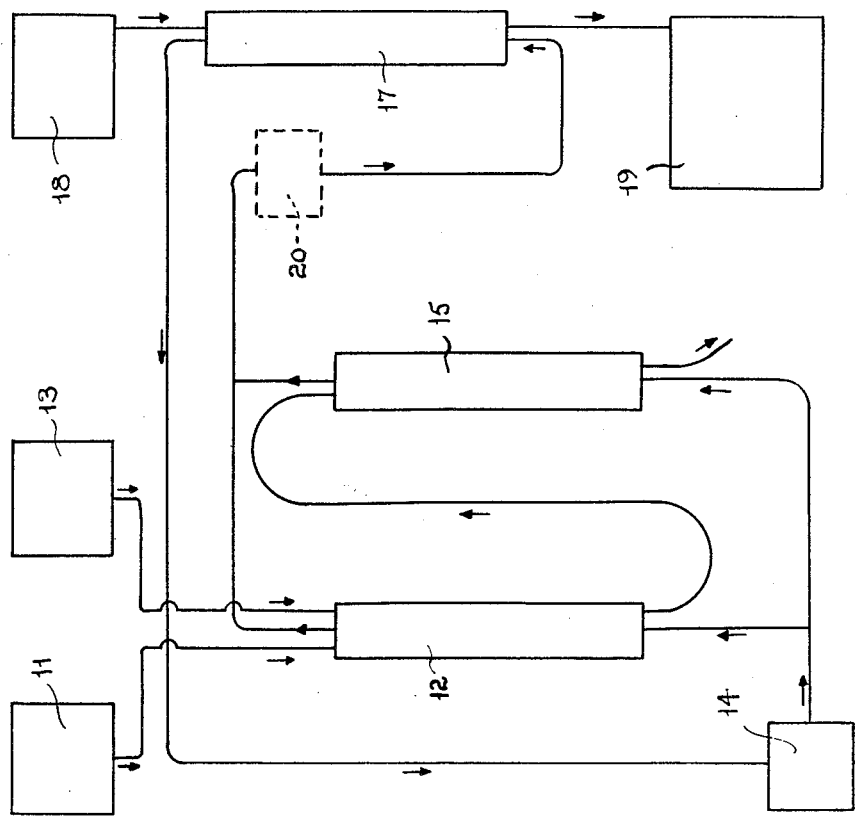

Referring to FIGURE 2 of the accompanying drawings, contaminated sodium thiocyanate aqueous solution of 13 percent concentration by weight was fed continuously at a rate of 100 litres/hour from a liquid reservoir 11 to the top of a column 12. 18 litres/hour of 50 percent by weight sulphuric acid was simultaneously run from acid reservoir 13 to the top of the column 12, while di-isopropyl ether was introduced continuously to the bottom of the column from reservoir 14. The rate of flow of the ether into column 12 was 200 litres/hour. The reaction of the sulphuric acid and sodium thiocyanate produced thiocyanic acid, which was extracted from its aqueous solution into the counter-current ether, to leave the top of the column 12 as a 4.8 percent by weight solution.

The aqueous waste from the bottom of column 12 was introduced to the top of a second column 15, wherein it was allowed to flow counter-current to a stream of the ether flowing at the rate of 200 litres/hour. The ethereal solution of thiocyanic acid leaving the top of column 15 was of 0.2 percent concentration by weight. The aqueous out-flow from the bottom of column 15 contained only a very small quantity of sodium thiocyanate, together with a considerable amount of sodium sulphate, and was disposed of as effluent.

The ethereal solutions from the tops of the two columns were combined and introduced to the foot of a scrubber 17, up which they flowed counter to a stream of 22 percent by weight caustic soda running from a reservoir 18 at the rate of 26 litres/hour. The sodium hydroxide and the thiocyanic acid reacted to re-form sodium thiocyanate, which was collected in a storage vessel 19 as a 32 percent by weight aqueous solution. The ether, from which the thiocyanic acid had been removed, was returned from the top of the scrubber 17 to the reservoir 14.

The overall recovery of the sodium thiocyanate, calculated as a percentage of the original sodium thiocyanate, was 96.1 percent.

The numeral 20 in FIGURE 2 of the accompanying drawings indicates a position in the circuit at which an ion-exchange column may conveniently be inserted for removing iron from the ethereal thiocyanic acid solution. Any iron present as impurity in the contaminated sodium thiocyanate solution subjected to treatment tends to form a thiocyanate complex, a proportion of which is carried into the ethereal solution. If the column contains a suitable ion-exchange resin, such as a sulphonated copolymer of polystyrene and divinyl benzene, the iron ions are effectively removed from the solution. The resin may be periodically regenerated using a 15 percent solution of sulphuric acid, followed by a water wash. So far at least as the above-mentioned resin is concerned, it is desirable that the di-isopropyl ether feed rate to the columns 12 and 15 be increased, when the ion-exchange column is included in the circuit, to such a value that the thiocyanic acid concentration in the combined ethereal solutions from columns 12 and 15 is not greater than 1.5 percent by weight.

*Example 4*

A further regeneration of contaminated sodium thiocyanate solution was carried out in a modified form of the apparatus illustrated in FIGURE 2. In this modified form, the sulphuric acid was introduced to the top of both of the columns 12 and 15, and the thiocyanic acid solutions taken from these columns were equal in strength.

In this experiment, which was conducted over a 2-hour period, a total of 67 litres of 13.6 percent by weight sodium thiocyanate solution in water was run into column 12. A total of 11 litres of 50 percent by weight sulphuric acid was run from reservoir 13 into the two columns 12 and 15. From each of these columns a 2.5 percent solution of thiocyanic acid in ether was taken and the combined solutions were reacted in scrubber 17 with 16 litres of 22 percent by weight caustic soda solution. A 32 percent aqueous solution of sodium thiocyanate was ultimately collected in the storage vessel 19.

The waste aqueous liquor taken as effluent from the bottom of column 15 contained only 0.32 percent of sodium thiocyanate and the overall recovery of sodium thiocyanate was 97.5 percent of that contained in the original contaminated solution.

What we claim is:

1. A process for the manufacture of the thiocyanates of the alkali metals and of calcium and barium, comprising reacting an aqueous solution of an inorganic thiocyanate with a strong acid in the presence of an inert, substantially water-immiscible liquid in which the thiocyanic acid formed has a markedly greater solubility than in water, separating the aqueous and non-aqueous layers, and reacting the thiocyanic acid in the non-aqueous layer with an inorganic reactant selected from the group consisting of the alkali metals, barium, calcium, the oxides and hydroxides of the alkali metals and of barium and calcium.

2. A process as claimed in claim 1, in which the liquid is an ether.

3. A process as claimed in claim 2, in which the ether is di-isopropyl ether.

4. A process as claimed in claim 1, in which the inorganic reactant has a different cation from that of said inorganic thiocyanate.

5. A process for the regeneration of a contaminated alkali metal thiocyanate solution, comprising reacting the solution with sulphuric acid in the presence of an ether, separating the aqueous and ethereal layers and reacting the ethereal solution of thiocyanic acid so obtained with an aqueous solution of the hydroxide of the same alkali metal.

6. A process as claimed in claim 5, in which the alkali metal is sodium.

7. A process as claimed in claim 6, in which the ether is di-isopropyl ether.

References Cited in the file of this patent

UNITED STATES PATENTS

| | | |
|---|---|---|
| 2,179,943 | Mathes | Nov. 14, 1939 |
| 2,639,291 | Pfann | May 19, 1953 |

OTHER REFERENCES

"The Chemistry of Cyanogen Compounds," by Williams, 1915 ed., pages 198 and 203, J. and A. Churchil, London.

McPherson and Henderson Book, "A Course in General Chemistry," third edition, 1927, page 245, Ginn & Co., N.Y. publishers.